April 1, 1930.                    C. V. SEE                    1,752,397
                              FISHING DEVICE
                           Filed Feb. 25, 1929
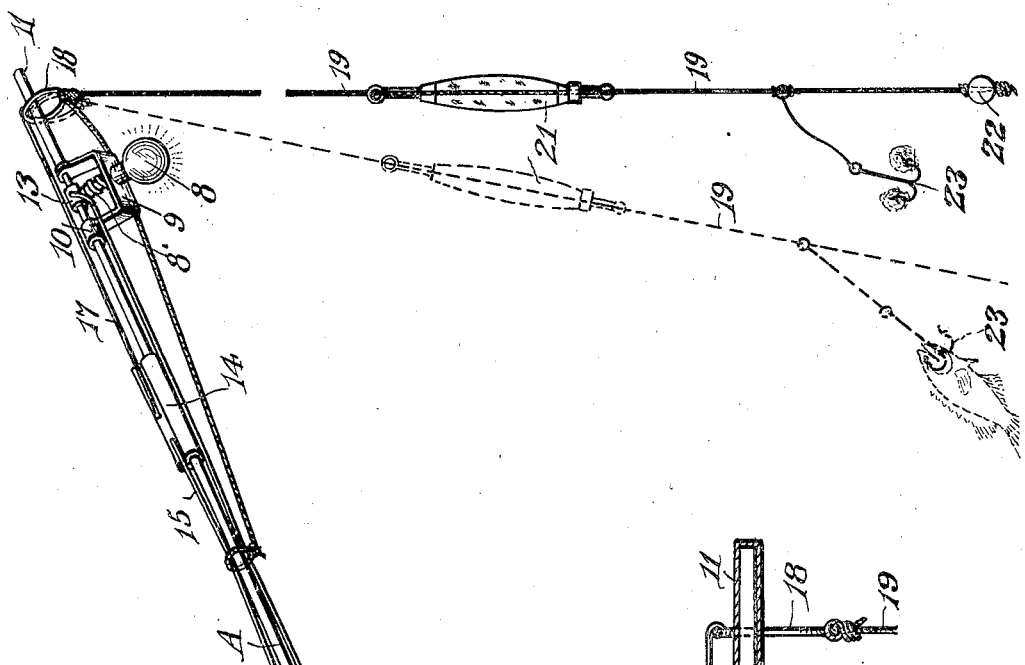
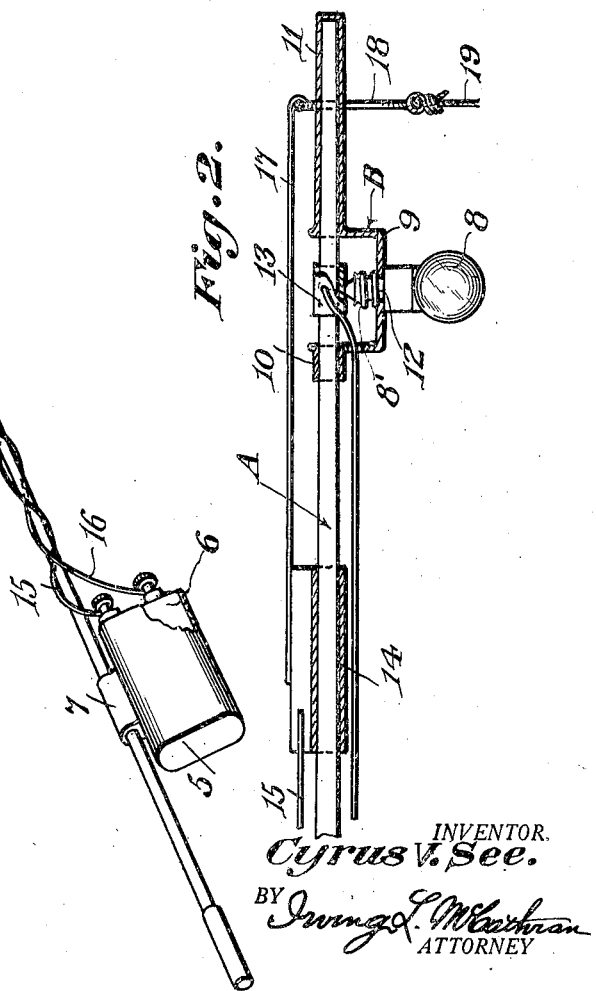
INVENTOR.
Cyrus V. See.
BY Irving L. Wachman
ATTORNEY Patented Apr. 1, 1930

1,752,397

UNITED STATES PATENT OFFICE

CYRUS V. SEE, OF HARDIN, MISSOURI

FISHING DEVICE

Application filed February 25, 1929. Serial No. 342,458.

This invention relates to fishing poles and one of the primary objects of the invention is the provision of novel means for giving a visual signal upon the biting of a fish at the end of a fishing line.

Another important object of the invention is the provision of means for facilitating night fishing, said means embodying a signal lamp and novel means for closing the circuit through the lamp when a pull is exerted upon the line by a fish.

A further salient object of the invention is the provision of a fishing pole attachment for giving a visual signal when a fish bites upon the line, said means embodying a small battery connected with the fishing pole, a signal lamp and means for closing the circuit through the battery and lamp when a pull is exerted upon the line, the circuit closing means embodying a novel structure including a ring surrounding the free end of the fishing pole to which the line is attached, and a thimble on the free end of the pole, the ring and thimble being connected in the circuit and to the opposite poles of the battery, whereby, when a pull is exerted on the fishing line in any direction, the ring will be depressed and brought into contact with the thimble.

A still further object of the invention is to provide a visual signal attachment for fishing poles for night fishing of the above character, which will be durable and efficient in use, one that will be simple and easy to manufacture, and one which can be placed upon the market and incorporated with a conventional fishing pole at a small cost.

With these and other objects in view, the invention consists in the novel construction, arrangement and formation of parts, as will be hereinafter more specifically described, claimed, and illustrated in the accompanying drawings, in which drawing:

Figure 1 is a perspective view of a fishing pole showing my improved attachment incorporated therewith and illustrating the same in use, and Figure 2 is a side elevation of the outer end of the fishing pole showing parts of my device incorporated therewith, said parts being shown in longitudinal section.

Referring to the drawings in detail, wherein similar reference characters designate corresponding parts throughout the several views, the letter A generally indicates a fishing pole and B my improved signal attachment therefor.

The pole A can be of any preferred or conventional character either of the sectional or one-piece variety and will not be described in detail.

My improved attachment B comprises a casing 5 for receiving and holding a small pocket flashlight battery 6. The casing 5 can be removably held on the fishing pole A in any desired way and in the present instance I have shown the casing 5 connected with the pole A by means of a sleeve 7 carried by and connected with the casing.

The invention in the attachment resides more particularly in the novel means for supporting a signal light 8 and the novel means for closing the circuit through the signal light and the battery 6.

The means for supporting the signal light or bulb 8 includes a substantially U-shaped strap of metal 9 having a ferrule 10 formed on the inner end thereof and a thimble 11 carried by the outer end thereof. The ferrule 10 and thimble 11 are slipped on the outer end of the fishing pole A and held thereon against movement in any desired manner. The U-shaped strap 9, the ferrule 10 and the thimble 11 are formed of electric conducting material and the strap 9 is provided at the central portion thereof with a threaded opening 12 for the reception of the threaded base 8' of the signal lamp or bulb 8. Intermediate the legs of the U-shaped strap 9 and spaced from the ferrule 10 and the thimble 11 is a sleeve 13 fitted on the fishing pole and formed of electric conducting material and the base 8' of the bulb 8 is adapted to be threaded into the strap 9 into contact with the sleeve 13.

Inward of the ferrule 10 the pole A has fitted thereon a clip or sleeve 14 also formed of electric conducting material and this sleeve has soldered or otherwise secured thereto a feed wire 15 leading from one terminal of the battery 6. The other terminal of the battery has secured thereto a return wire 16 which is soldered or otherwise secured to the sleeve 13.

The clip or sleeve 14 has secured thereto a leaf spring 17 which extends forwardly toward the front end of the pole A and terminates in spaced relation to the thimble 11. A contact ring 18 of greater diameter than the thimble is secured to the free end of the leaf spring 17 and this spring normally maintains the contact ring 18 in spaced relation to the thimble. The fishing line 19 can be secured to the ring at a point diametrically opposite the leaf spring 17. If desired, the line can be extended from the ring and secured to the pole as at 20. The line can be equipped with a float 21 if desired, a sinker 22 and a hook 23.

In the operation of the improved device, the fishing line and pole are used in the ordinary manner and when the fish bites on the hook 23 and exerts a pull on the line 19 in any direction, the contact ring 18 will be brought into engagement with the thimble 11 which will close the circuit through the battery 6 and the signal light 8 causing the same to glow and thus give a visual signal that a fish is on the line.

Thus the device is particularly adapted for use in night fishing when it is difficult to see the float 21.

While I have shown the line 19 tied to the contact ring 18, the line can be simply led through the ring and the ring used as a guide to permit the line to be used with a reel and it is obvious that when a pull is exerted on the line, tension will be exerted on the ring 18 causing the same to be moved against the tension of the spring 17 into contact with the thimble 11 causing the closing of the circuit.

By referring to Figure 1, it can be seen that when the ring engages the thimble, the current will flow from the battery through wire 15, through the sleeve 14, spring 17, contact ring 18, thimble 11, strap 9, through one terminal of the lamp, through the base of the lamp, through the sleeve 13, through wire 16, back to the battery 6.

Changes in details may be made without departing from the spirit or the scope of this invention, but;

What I claim as new is:

1. A fishing device comprising a pole, a metal contact member carried by the end of the pole, and a spring pressed contact ring receiving the contact member and normally held in spaced relation by said spring, and a fishing line extended through said ring.

2. A fishing device, a pole, a metal electric conducting member carried by one end of the pole, a combined contact and fishing line guide ring receiving the contact member, and a spring normaly holding the ring out of engagement with the contact member.

3. A fishing device comprising a fishing pole, an electric contact member carried by the end of the pole, a combined fishing line guide and contact ring receiving said contact member, a spring normally holding the ring out of engagement with the contact member, a lamp socket support, a signal lamp in the socket, a source of energy carried by the pole, and conducting members connected to the terminals of the battery and to the terminals of the lamp socket through contact member and ring.

4. A fishing device, a pole, a clip of electric conducting material secured to the pole, a contact thimble carried by the outer end of the pole, a combined contact ring and fishing line guide receiving the contact thimble, a spring connected to the clip and supporting said ring and normally holding the same out of engagement with the contact thimble, a U-shaped strap having a lamp base receiving socket therein connected with the thimble, a sleeve of conducting material carried by the pole, a lamp threaded in the strap engaging the sleeve, a casing secured to the pole, a battery in said casing, and conducting wires secured respectively to the clip and to the contact sleeve connected with the terminals of the battery.

In testimony whereof I affix my signature.

CYRUS V. SEE.